March 8, 1949.    F. W. STRASSHEIM    2,463,825
FILTER ELEMENT
Filed Aug. 18, 1944    2 Sheets-Sheet 2
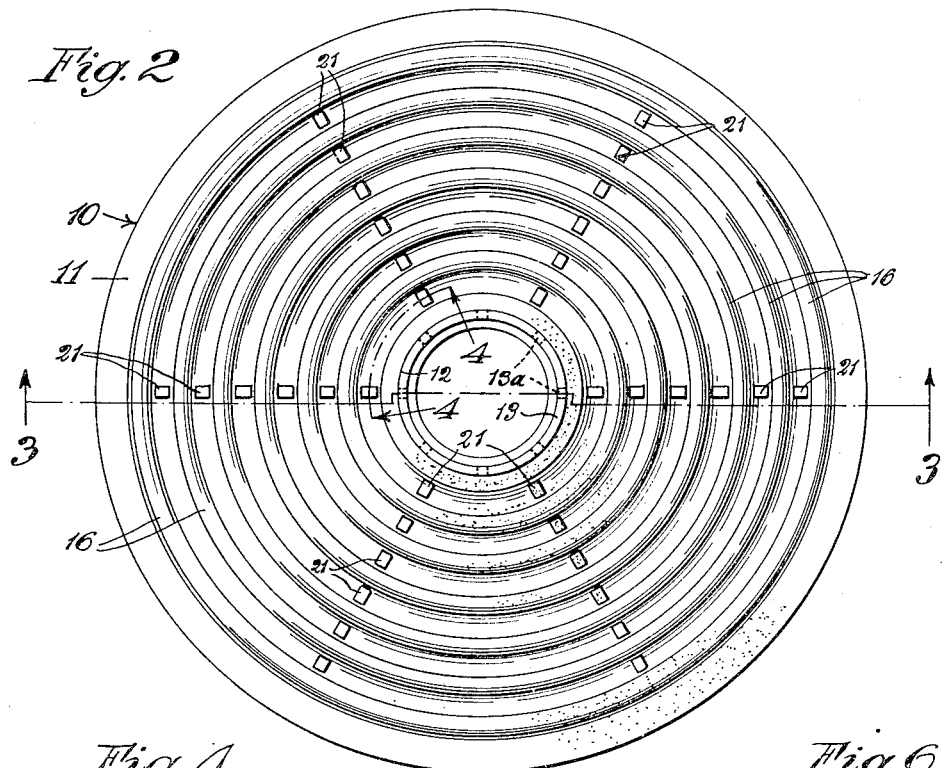
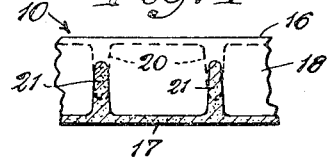
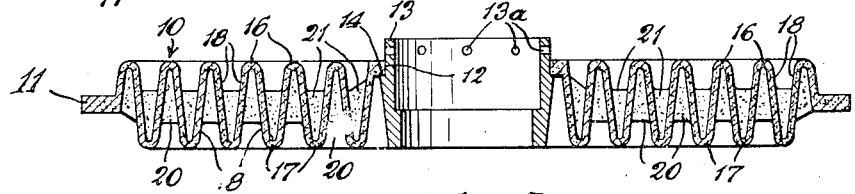
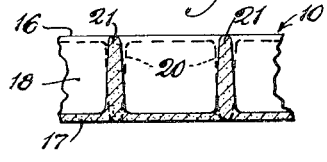
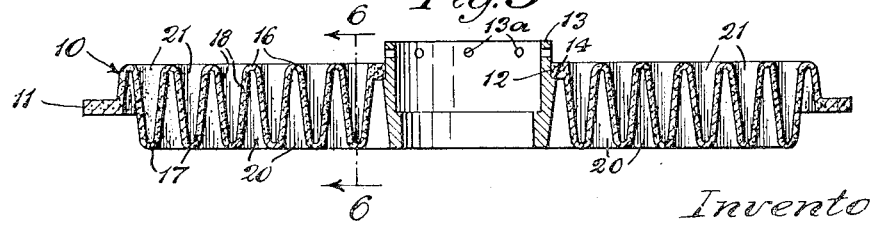
Inventor
Frederick W. Strassheim
by Parker & Carter
Attorneys.

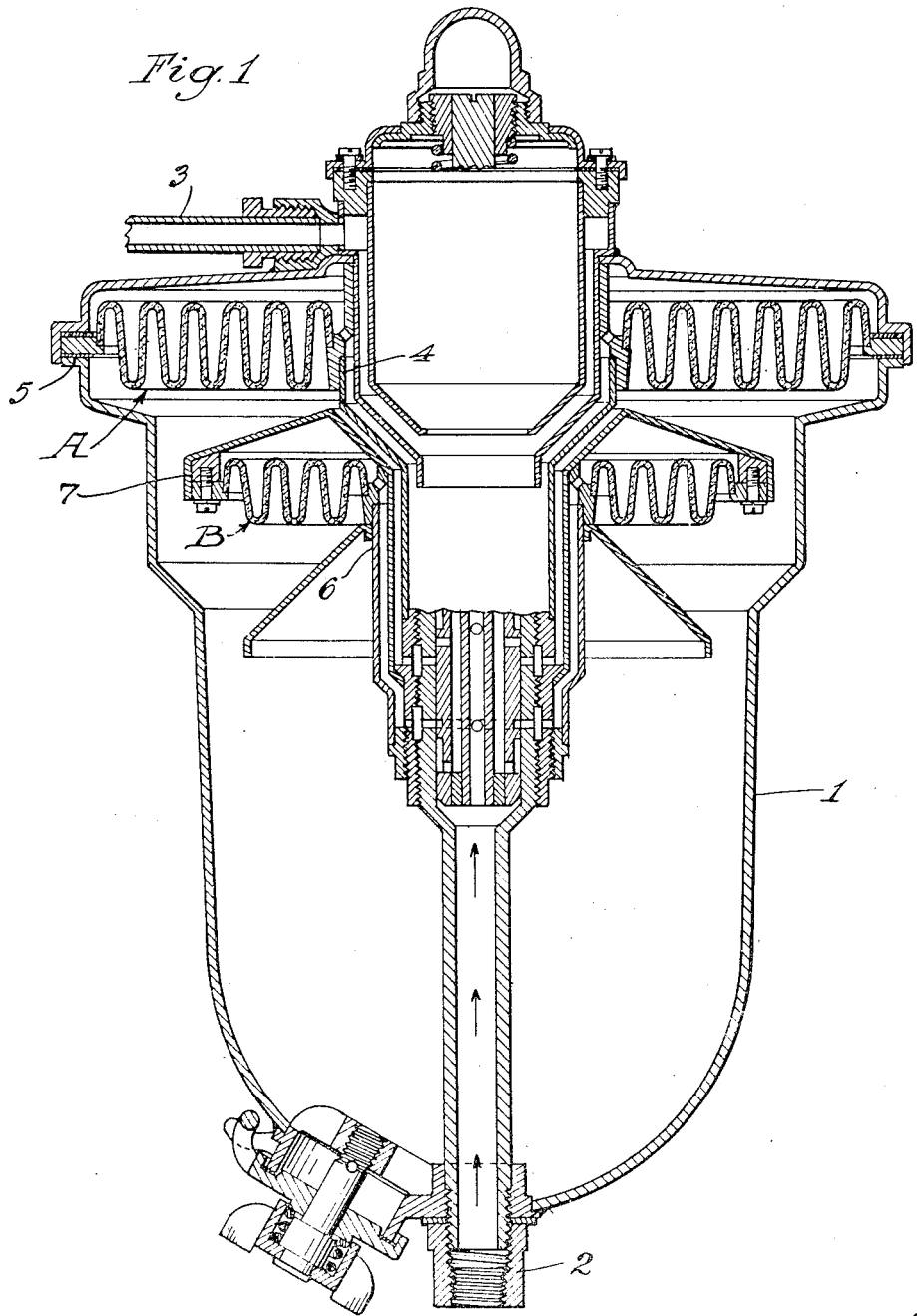

Patented Mar. 8, 1949

2,463,825

UNITED STATES PATENT OFFICE 2,463,825

FILTER ELEMENT

Frederick W. Strassheim, Chicago, Ill.

Application August 18, 1944, Serial No. 550,022

6 Claims. (Cl. 210—121)

My invention relates to an improvement in filter elements and has for one purpose to provide a filter element which provides a maximum filter area in relation to the diameter of the filter element and in relation to the space within which the filter element is housed.

Another purpose is to provide a self supporting filter element of substantial strength.

Another purpose is to provide a filter element which may be made of thin porous material.

Another purpose is to provide a filter element adapted to be formed of powdered metal.

Another purpose is to provide a filter element which is shaped for assembly in multiple to form a larger filter member.

Another purpose is to provide a corrugated filter element with integral reinforcement.

Another purpose is to provide a reinforced filter element in which the reinforcement causes a minimum of interference to cleaning the surface of the filter element.

The present application is a continuation in part of my application No. 509,822, filed in the United States Patent Office on November 11, 1943, and now abandoned.

Other purposes will appear from time to time in the course of the specification and claims.

I illustrate the invention more or less diagrammatically in the accompanying drawings wherein;

Figure 1 illustrates a part of a filter housing in which two of my filter elements are positioned;

Figure 2 is a plan view of one of my filter elements;

Figure 3 is a section taken on the line 3—3 of Fig. 2;

Figure 4 is a section taken on the line 4—4 of Fig. 2;

Figure 5 is a diametric cross section of a variant filter element; and

Figure 6 is a section taken on the line 6—6 of Fig. 5.

Like parts are indicated by like symbols throughout the specification and drawings.

Referring to the drawings it will be understood that the peripheral form of the filter element may be varied, and also the disposal of the corrugations and reinforcements. For example, the below described variations of the arrangement of the corrugations and reinforcements, shown in Figs. 3, 7 or 9 may be employed with any of the variant forms shown in Figs. 2 and 11 to 15.

Referring to the drawings, 1 generally indicates a filter housing the details of which do not of themselves form part of the present invention. 2 illustrates an inlet passage and 3 and outlet passage. It will be understood that any suitable means may be employed for directing a flow of the liquid to be filtered through the filtering elements generally indicated as A and B. Since these flow directing means do not of themselves form part of the present invention they are omitted.

Referring to the filter members proper and the means for mounting them, I illustrate an inner support 4 and an outer support 5 for the filter member A and an inner support 6 and an outer support 7 for the filter member B. The housing is merely illustrative, and it will be understood that any suitable means may be employed for mounting one or more of my filter members in any suitable housing or passage.

Referring to the filter member proper as shown for example in Figs. 2, 3 and 4 I illustrate a filter element generally indicated as 10 which includes a circumferential outer flange 11 which may be unitary with the member 10. It is shown as having a circular periphery and a central aperture 12 surrounded by a sleeve 13 having a ledge 14. This sleeve may be secured in relation to the filter element. Or an equivalent support, as shown at 5 in Fig. 1, may form part of or be secured to the filter housing 1. In the forms of Figs. 2 to 10 a series of corrugations extend concentrically about the center of the filter member forming opposite crests 16 and 17 connected by intermediate portions 18. The crests and the intermediate portions are preferably of substantially uniform thickness, and are somewhat thinner than the outer edge or abutment portions 11. Since a thin material is employed, I provide reinforcing elements 20, 21, which in the form of Fig. 3, terminate short of the crests 16 and 17 respectively. They are preferably radially arranged, and constitute radially extending integral reinforcements which have the effect of radially extending ribs, but provide a minimum interference with the filtration area. If desired, for greater strength, they may be made of greater overall height. For example in Figs. 5 and 6 I illustrate reinforcements 20 and 21 which are of the same overall height or thickness as the length of the corrugations. Under most circumstances this extra height is unnecessary and may be omitted, particularly where it is desired to save weight and material, as where powdered metal is used. The sleeve 13 is shown as formed with filtrate apertures 13a.

In the form of Figs. 3 to 6 the overall form of the filtering member is flat.

It will be realized that whereas I have described and shown a practical device, nevertheless many changes may be made in size, shape, number and disposition of parts without departing from the spirit of my invention. I therefore wish my description and drawings to be taken in a broad sense diagrammatic rather than as limiting me to my precise showing.

The use and operation of my invention are as follows:

The filter elements herein described and shown may be modified widely in transverse cross section and in peripheral form. All the forms herein shown have in common the employment of a relatively thin corrugated filtered body which is preferably provided with reinforcements extending between bends of the corrugations and which are arranged to form more or less continuous reinforcing elements.

A wide variety of materials may be employed. I may for example employ any suitable ceramic or porous plastic or porous rubber. I find, however, that the use of a powdered metal filter is in many circumstances highly advantageous. A filter element may be formed by subjecting powdered metal to pressure and heat in any suitable form or die, to a degree sufficient to sinter or bond the metal particles together. In filter practice, it is advantageous to employ metal in the form of very small spherical particles. This provides a substantially uniform mesh of filtering apertures. By employing integral reinforcements I am able to provide a filter element using very thin material, with deep corrugations. The actual filtering area is thus greatly multiplied and a strong self-supporting structural unit is provided. While it is under most circumstances advantageous to employ integral reinforcements formed of the same material as the corrugations, I may employ inserts of certain different materials having characteristics of resistance to strain. For example, I may employ corrugations of porous rubber reinforced by metal inserts or inserts of some material other than rubber. Or I may employ solid metal inserts to which a powdered metal corrugated filtering body may be secured. I may apply the reinforcements during either the formation of the filtering body or after it is formed. I have found, in practice, that powdered bronze filter elements are highly satisfactory, but I mention that material as an example, not as a limitation.

I claim:

1. A self supporting filter element including a generally rigid imperforate body of liquid pervious material, said body having formed therein a series of deep circular generally concentric corrugations, said corrugations being of a depth substantially exceeding the radial separation between the crests of adjacent corrugations, the material of which said body is formed being of substantially less thickness than the separation between the corrugations, and integral reinforcing means for said filter element including bridges extending between adjacent corrugations, said bridges being located within said corrugations.

2. A filtering body comprising a self supporting, imperforate filtering member of porous metal, generally circular in shape and provided with a series of generally concentric corrugations of substantially greater depth than the thickness of the material of which the body is formed, and of substantially greater depth than the distance between crests of the corrugations, and integral generally radial reinforcements extending between adjacent corrugations and positioned within said corrugations.

3. A filtering body comprising a self supporting, imperforate filtering member of porous metal, generally circular in shape and provided with a series of generally concentric corrugations of substantially greater depth than the thickness of the material of which the body is formed, and of substantially greater depth than the distance between crests of the corrugations, and integral generally radial reinforcements extending between adjacent corrugations and positioned within said corrugations, said reinforcements being located on one face only of said filtering body.

4. A filtering body comprising a self-supporting, imperforate filtering member of porous metal, generally circular in shape and provided with a series of generally concentric corrugations of substantially greater depth than the thickness of the material of which the body is formed, and of substantially greater depth than the distance between crests of the corrugations, and integral reinforcements extending between adjacent corrugations and positioned within said corrugations.

5. A filtering body comprising a self-supporting, imperforate filtering member of porous metal, generally circular in shape and provided with a series of generally concentric corrugations of substantially greater depth than the thickness of the material of which the body is formed, and of substantially greater depth than the distance between crests of the corrugations, and integral reinforcements extending between adjacent corrugations and positioned within said corrugations, said reinforcements being located on one face only of said filtering body.

6. A filtering body comprising a one-piece self-supporting imperforate filtering member, generally circular in shape and provided with a series of generally concentric corrugations, said body being formed of substantially rigid powdered metal, a plurality of bridges extending between and connecting said corrugations and integral with said body, and a circumferential reinforcement of greater thickness than the material of said corrugations, said reinforcement being integral with said body.

FREDERICK W. STRASSHEIM.

REFERENCES CITED

The following references are of record in the file of this patent:

UNITED STATES PATENTS

| Number | Name | Date |
|---|---|---|
| 984,704 | Rarick | Feb. 21, 1911 |
| 1,015,407 | Selg | Jan. 23, 1912 |
| 1,737,313 | Kamrath | Nov. 26, 1929 |
| 1,863,070 | Schonfeldt | June 14, 1932 |
| 2,023,423 | Kleckner | Dec. 10, 1935 |
| 2,220,641 | Davis | Nov. 5, 1940 |
| 2,297,817 | Truxell et al. | Oct. 6, 1942 |
| 2,304,618 | Williams | Dec. 8, 1942 |
| 2,332,188 | Andrews | Oct. 19, 1943 |
| 2,372,865 | Taylor | Apr. 3, 1945 |

FOREIGN PATENTS

| Number | Country | Date |
|---|---|---|
| 200,577 | Great Britain | July 12, 1923 |
| 401,287 | Great Britain | Oct. 30, 1933 |
| 803,101 | France | June 29, 1936 |
| 116,684 | Australia | Mar. 8, 1943 |